June 23, 1925.
F. SCHMITZ
LENS
Filed March 20, 1924
1,543,126
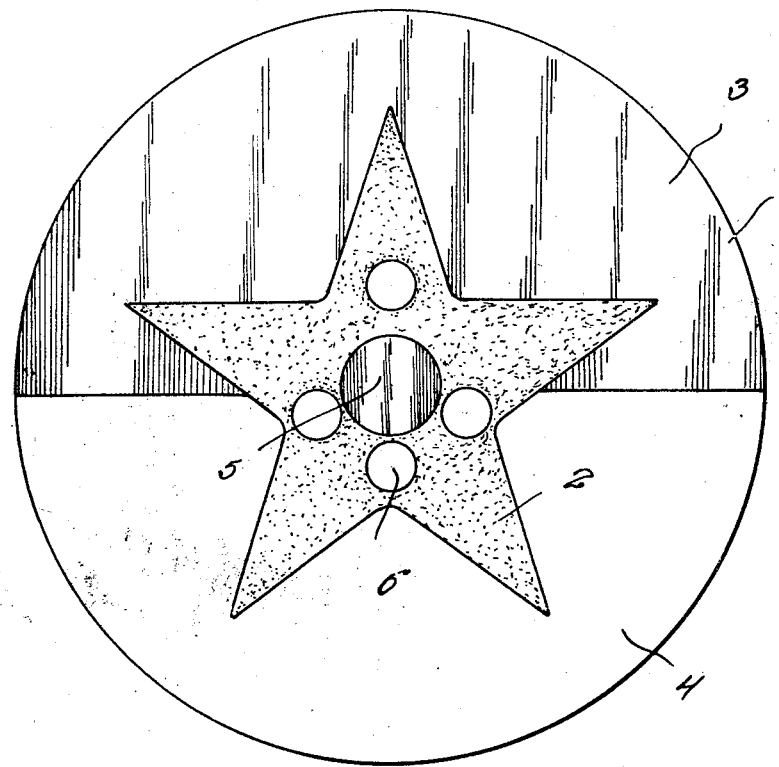
F. Schmitz,
Inventor
By Clarence A. O'Brien
Attorney Patented June 23, 1925.

1,543,126

UNITED STATES PATENT OFFICE.

FREDERICK SCHMITZ, OF ALEXANDRIA, INDIANA.

LENS.

Application filed March 20, 1924. Serial No. 700,649.

*To all whom it may concern:*

Be it known that I, FREDERICK SCHMITZ, a citizen of the United States, residing at Alexandria, in the county of Madison and State of Indiana, have invented certain new and useful Improvements in Lenses, of which the following is a specification.

This invention relates to new and useful improvements in lens for automobile headlights or the like and has for its principal object to provide a lens which is of such a construction as to prevent the rays of light passing therethrough, from blinding the operator of the vehicle coming in the opposite direction. One of the important objects of the present invention is to provide a lens of the above mentioned character, wherein the rays of light passing therethrough will not be directed in such a manner as to blind the driver of an oncoming machine but will direct the rays of light onto the road whereby the operator of the vehicle may readily have a good view of the surface of the ground over which the vehicle is travelling.

A further object of the invention is to provide a lens of the above mentioned character, wherein the necessity for use of a mechanical dimmer is obviated, means being further provided for softening the rays of light passing through the lens.

A further object of the invention is to provide a lens of the above mentioned character, which is simple in construction, inexpensive, durable, and further well adapted for the purpose for which it is designated.

Other objects and advantages of this invention will become apparent during the course of the following description.

In the accompanying drawing forming a part of this specification, and in which like numerals designate like parts throughout the same, Figure 1 is a front elevation of my improved lens.

In the drawing wherein for the purpose of illustration is shown the preferred embodiment of my invention, the numeral 1 designates my improved lens. Formed in the central portion of the lens 1 is the frosted or ground portion 2 which in the present instance simulates a star, although it is to be understood that any other design may be used, and I do not wish to limit myself to the particular shape of the frosted portion of the glass for carrying out the objects of the present invention. The upper half of the lens 1 above the frosted portion 2 is opaque as is illustrated at 3 in the drawing. This opaque portion extends around the upper portion of the star shape center. The lower half of the lens 1 is transparent as illustrated at 4, and the transparent portion extends around the outer edges of the star-shaped frosted portion 2. The central portion of the star-shaped frosted portion 2 is provided with the opaque portion 5.

The frosted center 2 of the lens is further provided with a plurality of spaced transparent portions 6 in the manner as clearly shown in the drawing.

It will be readily apparent that the rays of light will not be caused to pass through the opaque upper half 3 and the opaque center 5 and the rays of light passing through the frosted portion will be softened. The transparent portions 4 and 6 will be the only means whereby the rays of light will be caused to be directed through the lens without any interference and without affecting the same. The purpose of the transparent portions 6 is to provide a means whereby the rays of light may be thrown for a greater distance than those projected through the translucent portion of the lens.

A lens of the above mentioned character, is highly beneficial in that when in use there will be no possibility of the driver of a vehicle approaching the vehicle upon which the lens is mounted to be blinded by the rays of light as the rays of light will be caused to be directed downwardly onto the roadbed.

A lens of the above mentioned character, may be manufactured at a very low cost, and may also be durable.

While I have shown the preferred embodiment of my invention, it is to be understood that various changes in the size, shape and arrangement of parts may be resorted to without departing from the spirit of the invention and the scope of the appended claim.

Having thus described my invention, what I claim is:—

A lens of the class described comprising a plane glass disk, the upper half thereof being opaque to intercept the passage of light rays therethrough, the lower half being clear and transparent so as to permit unrestricted passage of light rays therethrough, there being a semi-transparent ground area at the center of the plate and said ground area being shaped to provide a star, the points of which extend over and upon the opaque and transparent portions of said plate, there also being an opaque circular portion at the center of said star shaped area, and said circular portion being surrounded by circumferentially spaced clear glass openings confined within said ground area.

In testimony whereof I affix my signature.

FREDERICK SCHMITZ.